US007934696B1

(12) United States Patent
Gruben

(10) Patent No.: US 7,934,696 B1
(45) Date of Patent: May 3, 2011

(54) ETHER INJECTION CONTROL VALVE

(76) Inventor: John Gruben, Rochelle, IL (US)

( * ) Notice: Subject to any disclaimer, the term of this patent is extended or adjusted under 35 U.S.C. 154(b) by 951 days.

(21) Appl. No.: 11/708,812

(22) Filed: Feb. 21, 2007

Related U.S. Application Data

(60) Provisional application No. 60/775,419, filed on Feb. 21, 2006.

(51) Int. Cl.
*F16K 31/02* (2006.01)

(52) U.S. Cl. ................................ 251/129.15; 123/179.8

(58) Field of Classification Search ............ 251/129.15, 251/333; 123/179.8, 180 R, 180 E, 187.5
See application file for complete search history.

(56) References Cited

U.S. PATENT DOCUMENTS

| | | | | |
|---|---|---|---|---|
| 2,862,491 | A * | 12/1958 | Burack | 123/179.9 |
| 2,963,267 | A * | 12/1960 | Bancroft | 251/333 |
| 3,189,014 | A | 6/1965 | Kus | |
| 3,198,404 | A * | 8/1965 | Welches | 222/504 |
| 3,416,507 | A * | 12/1968 | Little | 123/179.9 |
| 3,750,639 | A | 8/1973 | DiGirolamo | |
| 3,960,131 | A | 6/1976 | Davis | |
| 3,966,097 | A | 6/1976 | Crown et al. | |
| 3,978,880 | A | 9/1976 | Crown et al. | |
| 4,088,247 | A * | 5/1978 | Hickman | 222/504 |
| 4,166,991 | A * | 9/1979 | Haner | 335/261 |
| 4,202,309 | A | 5/1980 | Burke | |
| 4,387,677 | A | 6/1983 | Guerrier | |
| 4,512,587 | A | 4/1985 | Burke et al. | |
| 4,774,916 | A | 10/1988 | Smith | |
| 5,388,553 | A | 2/1995 | Burke et al. | |
| 5,628,296 | A * | 5/1997 | Herrington et al. | 251/129.15 |
| 5,791,520 | A | 8/1998 | Tichenor | |
| 5,839,469 | A | 11/1998 | Burke | |
| 5,975,064 | A * | 11/1999 | Krimmer et al. | 251/129.15 |
| 6,032,836 | A | 3/2000 | Hiscocks et al. | |
| 6,354,253 | B1 * | 3/2002 | Katsumata et al. | 251/129.15 |
| 6,749,174 | B2 * | 6/2004 | Bircann et al. | 251/129.15 |
| 7,036,744 | B2 * | 5/2006 | Hirota | 251/129.15 |

OTHER PUBLICATIONS

Quick Start, website, http://www.quickstart-ether.com/support/, date last visited Dec. 16, 2005, 4 pages, http://www.quickstart-ether.com/products.php, date last visited Dec. 16, 2005, 2 pages, http:www.quickstart-ether.com/aboutether.php, date last visited 2 pages, http://www.quickstart.ws/, date last visited Dec. 16, 2005, 1 page.

(Continued)

*Primary Examiner* — John Rivell
*Assistant Examiner* — Craig Price
(74) *Attorney, Agent, or Firm* — Reinhart Boerner Van Deuren P.C.

(57) ABSTRACT

Methods and apparatuses for injecting starting fluid into an internal combustion engine are provided, through use of a control valve having a two-stage filter apparatus disposed upstream of a metering device internal to the control valve, a valve arrangement for positively opening and closing a gas pathway through the valve having a conical-shaped valve poppet and seat arrangement, an electrical solenoid having an electrical coil thereof operatively attached to the control valve in such a manner that the electrical coil may be removed and replaced without disturbing operative connections between a valve outlet and/or a valve inlet, in a valve construction including a one-piece valve body.

5 Claims, 2 Drawing Sheets

OTHER PUBLICATIONS

KBI, website, http://www.koldban.com/mainpages/systems.htm, date last visited Dec. 16, 2005, 1 page, http://www.koldban.com/mainpages/systems.dm.htm, date last visited Dec. 16, 2005, 2 pages, http://www.koldban.com/mainpages/systerns.nvt.htm, date last visited Dec. 16, 2005, 2 pages, http://www.koldban.com/mainpages/systems.ec.htm, date last visited Dec. 16, 2005, 2 pages, http://www.koldban.com/mainpages/systems.ds.htm, date last visited Dec. 16, 2005, 2 pages.

* cited by examiner

ETHER INJECTION CONTROL VALVE

CROSS-REFERENCE TO RELATED PATENT APPLICATIONS

This patent application claims the benefit of U.S. Provisional Patent Application No. 60/775,419, filed Feb. 21, 2006, the disclosure and teachings of which are incorporated herein in their entireties.

FIELD OF THE INVENTION

This invention relates to injection of starting fluid into internal combustion engines, and more particularly to solenoid-actuated valves for selectively injecting starting fluids, such as ether, into internal combustion engines.

BACKGROUND OF THE INVENTION

Internal combustion engines, particularly large diesel engines of the type used in over-the-road trucks, construction equipment, and the like, are frequently difficult to start, particularly in weather conditions where the ambient temperature is 50° F. or lower. To facilitate starting such engines, it has long been the practice to supply a volatile starting fluid, such as ether, to the engine during the initial “cranking” of the engine.

Generally the ether, or other starting fluid, is selectively supplied to the engine intake through use of a control valve having a valve inlet adapted for operative connection to a canister, or other source of the starting fluid, and an outlet operatively connected to the engine intake. Through the years, such control valves, and the systems in which they are utilized have taken many forms. In some approaches, the valve is manually controlled directly by the operator of the vehicle in which the engine is installed, through use of a mechanically linkage and actuating cable. In other prior approaches, control valves have included an electrical solenoid, for actuating the valve in response to electrical signals manually inputted by the operator of the vehicle, or by various types of automatic electronic control systems.

Examples of prior automatic starting fluid dispensing methods, apparatuses and control valves for use therein are provided by U.S. Pat. Nos. 5,839,469, to Burke; 5,388,553, to Burke et al.; 4,774,916, to Smith; 4,202,309, to Burke; 3,960, 131, to Davis; and 3,750,639, to DiGirolamo.

None of the prior approaches to providing starting fluid for an engine has proved to be entirely satisfactory, however. An improved method and apparatus, and particularly an improved control valve is desirable.

Some prior control valves do not include provisions for positively closing off the gas pathway between the valve inlet and outlet, thereby creating the potential for a vacuum leak through the control valve, when the inlet of the control valve is not presently connected to the source of starting fluid. Such a circumstance may occur, for instance, where starting fluid is provided from a detachable canister, of the type widely utilized in the industry for supplying ether, or other starting fluids to an engine. The Burke ’469 and ’309 patents do disclose control valves having seal elements for precluding such a vacuum leak, when the canister is not attached to the valve, but the particular seal construction and operations disclosed necessitate a fairly complex configuration for a number of the valve components, which therefore and desirably increases the cost and reduces the reliability of valves constructed in accordance with the teachings of Burke.

For control valves utilizing a solenoid-powered actuator, experience has shown that, far-and-away, the component of the control valve that fails most frequently is the electrical coil of the solenoid. To date, no prior control valve has provided the capability for removal and replacement of the electrical coil of the solenoid, while the remainder of the control valve remains operatively connected to the engine and/or the canister, or other source of starting fluid. Considerable improvement would be provided by a control valve apparatus and/or method allowing the electrical coil of the solenoid to be replaced, without disturbing the remainder of the control valve, and in particular without having to disconnect operative connections between the valve outlet and the engine, and/or, removal of the canister or disconnection from the source of ether or starting fluid from the valve inlet.

Many starting fluid control valves and systems incorporate a metering device into the operative connection between the outlet of the control valve and the engine. The metering device typically includes one or more orifices of small size (having an effective diameter of 0.005 to 0.008 inches, for example) for regulating the flow of starting fluid into the engine intake to a pre-determined, desired, value. In some systems, this metering device is a separate component, inserted into tubing connecting the valve outlet to the engine. Having the metering device exposed in such interconnecting tubing, rather than being located internal to the control valve, is typically undesirable, in that it increases complexity and cost of the installation, and makes tampering with the metering device more probable, than in prior approaches where the metering device is incorporated into the valve. Generally speaking, therefore it is desirable to have the metering device incorporated into the control valve, rather than having it be a separate component in a starting fluid injection system.

Another problem encountered in prior starting fluid injection systems and control valves, is that the small orifices in the metering element can become blocked with particulate matter generated during operation of the control valve, or from environmental contamination. This is particularly a problem where no provision is made for blocking off the flow pathway through the control valve when the canister is not in place, such that engine vacuum can draw ambient air, which may include smoke, dust, moisture, or other particulate matter through the control valve while the canister is not present. Even where provisions are made for positively closing off the gas pathway through the control valve when the canister is not present, it must be expected that at least a small amount of particulate matter from the outside environment will make its way into the gas pathway, even if a new canister is immediately installed when an old one is removed. Such ambient particulate matter, in addition to any particulate matter which may be present inside of the starting fluid canister, or generated by operation of the control valve during its lifetime, can plug the orifices in the metering device.

The Burke ’469 patent discloses locating an orifice defining element in an exit port of a control valve, and providing a single-stage filter element just upstream from the orifice defining element. The configuration and retention provisions of the orifice defining element and single-stage filter of Burke ’469 result in a configuration which is overly complex to manufacture and which is not conducive to minimizing restrictions in gas flow through the valve, nor is the arrangement of Burke ’469 readily accessible for cleaning or replacement of the filter, and/or changing of the orifice defining element to match various applications of the valve.

As a final note, by way of background, prior control valves, used in starting fluid injection systems and methods, have been more complex to manufacture than is desirable, generally having a number of parts requiring that complex machining and assembly techniques be utilized, to ensure proper operation of the control valve.

What is needed therefore, is an improved method and apparatus for supplying starting fluid to an engine, and in particular, an improved control valve for use in such systems, addressing one or more of the problems or providing one or more of the desired attributes set out above.

BRIEF SUMMARY OF THE INVENTION

The invention provides improvements in methods and apparatuses for injecting starting fluid into an internal combustion engine, through the use of an improved control valve having a number of novel aspects, which may be used either singly or in combination with one another. These novel aspects include: a two-stage filter apparatus disposed upstream of a metering device located internal to the control valve; a valve arrangement for positively opening and closing a gas pathway through the control valve, which may include a conical-shaped valve poppet arrangement; an electrical solenoid operatively attached to the valve body in a valve element and having an electrical coil thereof configured and operatively attached to the control valve in such a manner that the electrical coil may be removed and replaced without disturbing operative connections between the valve outlet and/or the valve inlet; and inclusion of one or more aspects of the invention in a control valve having a simplified construction, including a small number of components which may be manufactured and assembled in a straight-forward manner, with such components preferably including a one-piece valve body.

In one form of the invention, an ether injection control valve is provided, for supplying ether, or other appropriate starting fluids, to an engine, with the control valve including a valve body, a flow-metering device, and a two-stage filter apparatus. The valve body defines a gas pathway therethrough, with the gas pathway having a valve inlet adapted for operative attachment thereto of a canister, or other appropriate source, of ether and a valve outlet adapted for operative attachment to an engine. The flow-metering device is disposed within the gas pathway substantially at the valve outlet, and the two-stage filter apparatus is disposed adjacent the metering device, upstream from the metering device, in the gas pathway.

A two-stage filter apparatus, according to the invention, may include a primary filter and a secondary filter, with the secondary filter being disposed between the flow-metering device and the primary filter. The secondary filter may be configured for catching and retaining particles of a smaller size than particles caught and retained by the primary filter.

A control valve, according to the invention, may further include a valve element operatively disposed in the gas pathway or selectively opening and closing the gas pathway. The valve element may be a conical-shaped poppet. The conical-shaped poppet may be disposed adjacent the valve inlet. The body of the valve may further include a conical-shaped valve seat for cooperatively receiving therein the conical-shaped poppet. The conical-shaped poppet and the valve seat may be disposed adjacent the valve inlet, or at other locations along the gas pathway. Use of the conical-shaped poppet provides significant advantage in facility of manufacture, and reliability of operation, in comparison to valve elements and prior control valves.

In some forms of the invention, a control valve includes an electrical solenoid operatively attached between the valve body and valve element, for selectively actuating the valve element in a manner causing a corresponding opening and closing of the gas pathway. The solenoid may include an electrical coil which is configured and operatively attached to the control valve in such a manner that the electrical coil may be removed and replaced, without disturbing the operative connection between the valve outlet and the engine. The electrical coil may be further configured and operatively attached to the control valve in such a manner that the electrical coil may be removed and replaced without disturbing the operative connection between the valve inlet and the source of ether, or other appropriate starting fluid.

A control valve, in accordance with the invention, may further include a valve body formed from a single piece of material. The various components of the control valve may further be constructed in such a manner that they can, for the most part, be readily fabricated by simple manufacturing processes, such as casting, molding, or machining through the use of an automated lathe or screw-machine, for example.

In forms of the invention having a removable and replaceable electrical coil, attachment of the electrical coil may be provided through an attachment element configured for threadably engaging the valve body, and having a grippable portion thereof accessible external to the control valve. The grippable portion may be configured in such a manner that it is not readily engageable with standard wrenches, but is rather engageable through gripping by human fingers or devices not capable of applying significant force, such as a spanner wrench or pliers. In those forms of the invention including a metering device and/or a two-stage filter, in accordance with the invention, the metering device may be installed in a manner that is relatively readily accessible, for ease of manufacture, such as, for example, being located in an outlet fitting, which engages the valve outlet. Removal of the outlet fitting, thus provides ready access to the metering device, in a manner allowing the metering device to be installed at a late stage of the manufacturing process, or even during installation, in order to allow for matching of the metering element with a particular installation of the control valve. A portion of the two-stage filter, such as, for example, the secondary filter element, may also be installed within the outlet fitting, for ready access, should it ever become necessary to provide cleaning and/or replacement of one or both elements of the two-stage filter.

The invention may be practiced in a variety of forms, including: methods and apparatuses for injecting ether, or another appropriate starting fluid, into an engine; a control valve for use in such methods and apparatuses; methods and apparatuses for constructing, installing and/or operating and maintaining a control valve, in accordance with the invention; or in any other form within the scope of the invention.

Other aspects, objects and advantages of the invention will be apparent from the following detailed description of an exemplary embodiment of the invention, taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
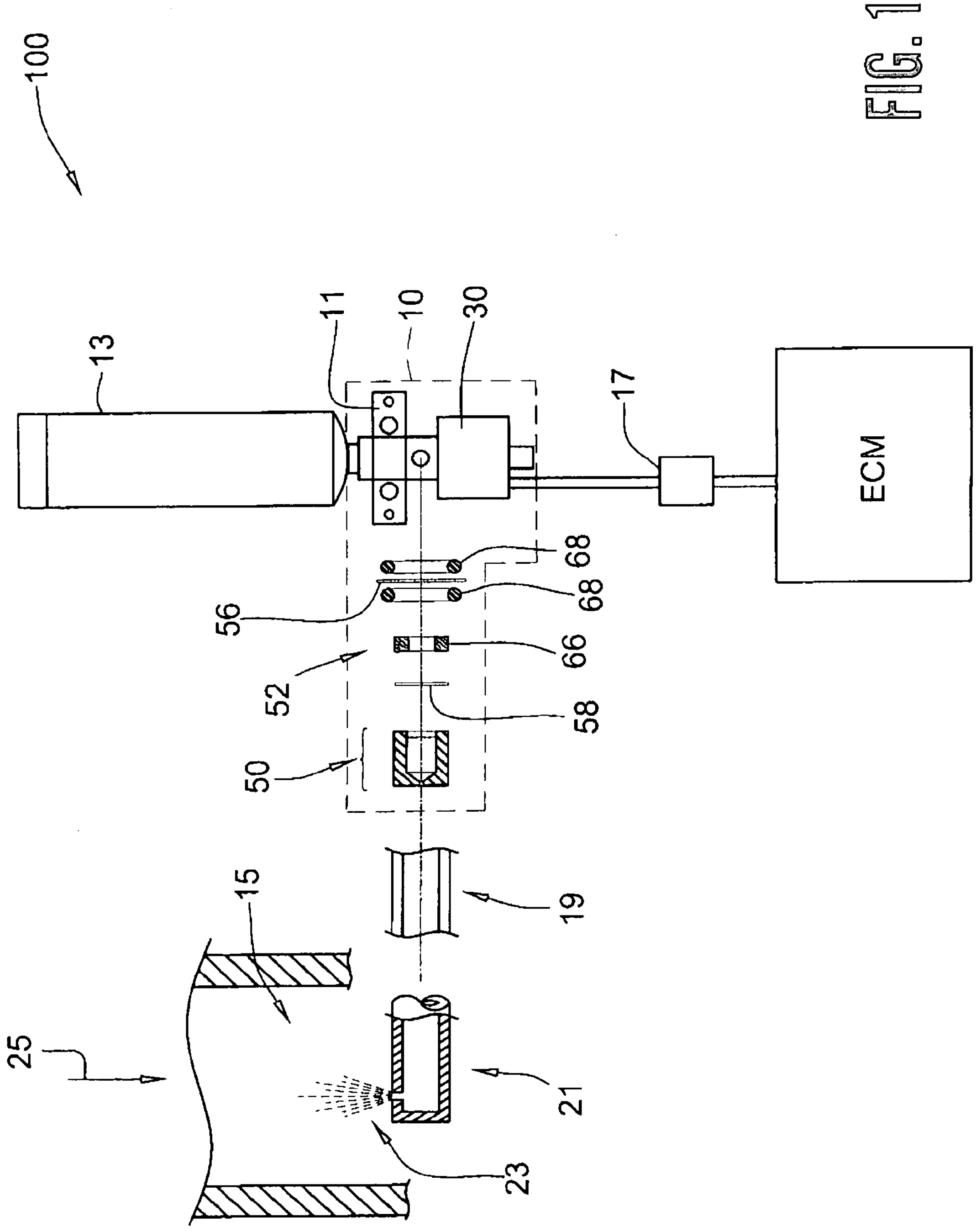
FIG. 1 is a schematic illustration of a starting fluid injection system, according to the invention.

FIG. 1 is a schematic representation of a first exemplary embodiment of the invention, in the form of a starting fluid injection system 100, incorporating, inter alia, an ether injection valve 10, as indicated by dashed lines in FIG. 1, in accordance with the gas valve shown in FIG. 2 and described in more detail below. It will be noted, that throughout the disclosure and claims of this patent application, although the term "ether" is commonly used for describing a starting fluid, it is contemplated that the invention is not restricted to use solely with ether as a starting fluid, but may also be utilized with any other appropriate starting fluid.

As shown in FIG. 1, the exemplary embodiment of a starting fluid injection system 100, according to the invention, includes the gas valve 10, which may be mounted to an appropriate structure by means such as the bracket 11 shown in FIG. 1, for providing operative attachment between a standard Department of Transportation (DOT) ether canister 13, an engine air intake 15, and a vehicle electronic control module (ECM). In the exemplary embodiment, the ether cylinder 13, or canister 13, includes a threaded attachment at a lower end thereof, as depicted in FIG. 1, which threadably engages the valve inlet 16, in a manner which will become more obvious in light of the detailed discussion below with regard to FIG. 2.

The gas valve 10, of the exemplary embodiment 100 includes an electrical solenoid 30 which is connected via wires and an electrical connector 17 to the vehicle ECM.

The control valve 10 also includes an internal metering device 50 and two-stage filter arrangement 52, disposed within an outlet fitting 62 of the control valve 10, in a manner described in greater detail below, with the outlet fitting 62 being connected via delivery tubing 19 to an atomizer 21 extending into the engine intake 15, for providing a flow of atomized ether into the engine intake 15, when commanded to do so by the vehicle ECM. Typically, the vehicle ECM will command that the control valve 10 supply atomized ether 23 to incoming air 25 passing through the engine intake 15 during cold-weather starting of the engine, or under other operating conditions where the injection of ether may lead to improved performance, and/or other desirable results, such as reducing harmful exhaust emissions from the engine.

Those having skill in the art, will readily recognize, however, that the invention may be practiced in many forms other than the exemplary embodiments specifically described herein, with such forms including various types of manual and automated control of a control valve, in accordance with the invention, either through manually or automatically operated mechanical and/or electrical actuation arrangements.

Figure 2:
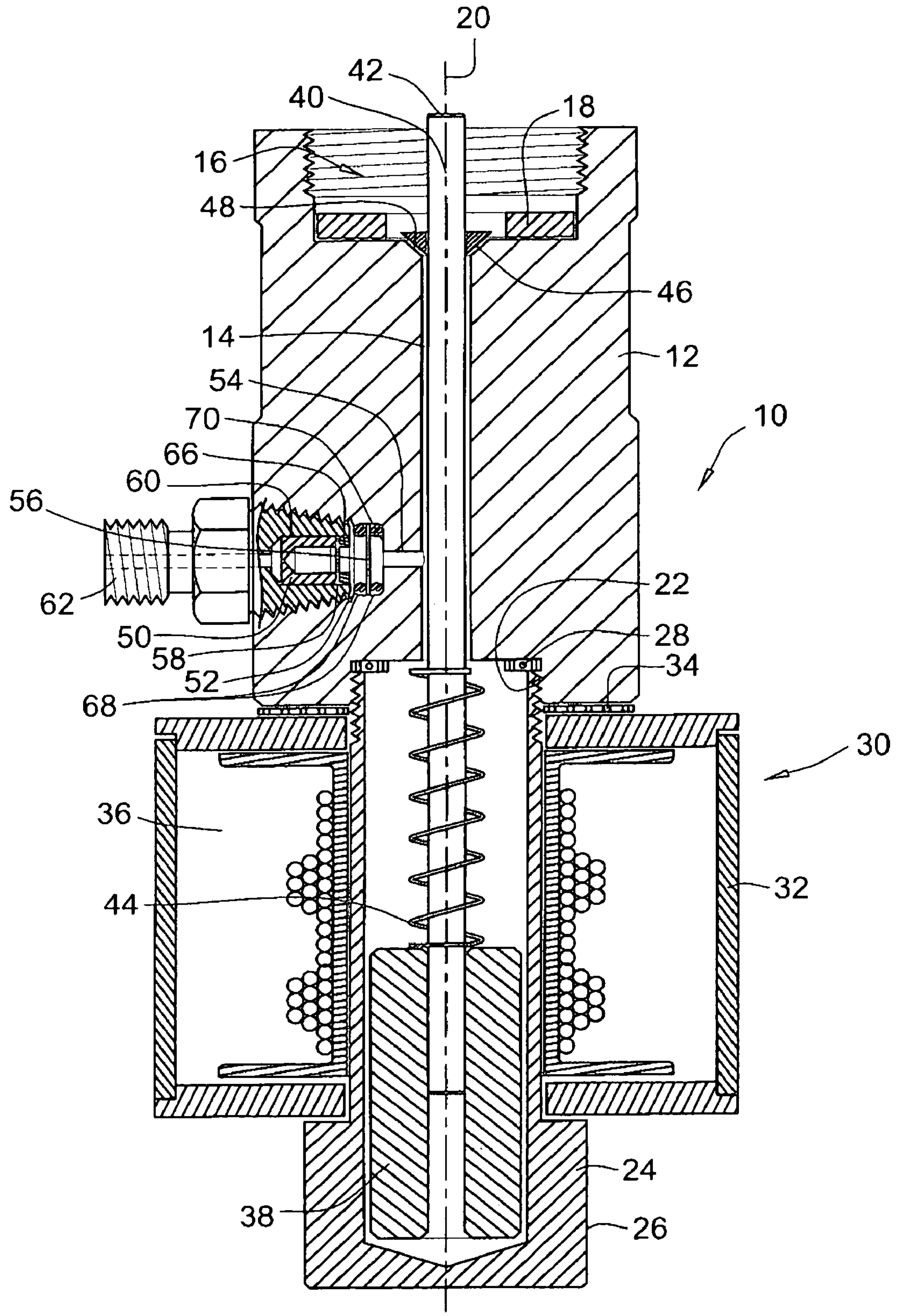
FIG. 2 is a cross-sectional orthographic view of an exemplary embodiment of a control valve, according to the invention.

As shown in FIG. 2, the exemplary embodiment of the control valve 10 includes a one-piece valve body 12 defining a gas pathway 14 therethrough. The gas pathway 14 includes a valve inlet 16, at an upper end of the valve body 12, when the control valve 10 is oriented as shown in FIG. 2. In the exemplary embodiment of the control valve 10, the valve inlet 16 is configured to form a female threaded coupling, for threaded engagement with a male outlet coupling of a standard DOT ether canister 13 (not shown in FIG. 2). An inlet seal 18 is provided within the valve inlet 16, for forming a gas-type seal between the fluid canister (not shown) and the valve body 12, when the canister 13 is properly threadably engaged with the valve body 12.

The valve body 12, of the exemplary embodiment is fabricated from a single piece of material, with the gas pathway 14 being formed substantially by a centrally located bore extending along a center line 20 of the valve body 12, from the valve inlet 16 which is also located concentrically with the gas pathway 14 about the center line 20 of the valve body 12.

The lower end of the valve body 12, as oriented in FIG. 2, includes a second female-threaded receptacle 22, also disposed concentrically about the center line 20, for threaded engagement with a tubular shaped solenoid retention element 24, having an upper end thereof configured for threadable engagement with the threaded receptacle 22, and a closed lower end thereof including an outer grippable portion 26 thereof which is accessible externally from the control valve 10, for threading the solenoid retention element 24 into the receptacle 22 at the lower end of the valve body 12. A gasket 28 is provided at the juncture of the threaded end of the solenoid retention element 24 and the threaded receptacle 22 in the lower end of the valve body 12.

The solenoid retention element 24 operatively connects an electrical solenoid, generally indicated by reference numeral 30 in FIG. 2, to the valve body 12. The electrical solenoid includes a stator portion 32, thereof, which is clamped against the lower end of the valve body by the solenoid retention element 24. A stator-to-housing gasket 34, is provided at the juncture of the stator portion 32, of the solenoid 30, and the lower end of the valve housing 12. The stator-to-housing gasket 34 provides a secondary sealing function, and also serves to absorb any tolerance stack up between the stator portion 32 and the solenoid retention element 24, in such a manner that the stator portion 32 is constrained against movement with respect to the valve body 12 and/or the solenoid retention element 24.

The stator portion 32 of the electrical solenoid 30 includes an electrical coil 36, for generating an electromagnetic field within the hollow internal cavity of the solenoid retention element 24, when an electric current is sent through the electrical coil 36.

The electrical solenoid 30 also includes an armature 38, slidingly disposed within the interior of the solenoid retention element 24, for axial movement substantially along the center line 20 of the valve body 12. The armature 38 is connected to a sliding shaft 40 which extends upward through the portion of the gas pathway 14 disposed concentrically about the valve body centerline 20, in such a manner that when an electrical current is applied to the electrical coil 36, the armature 38, and sliding shaft 40, attached to the armature 38, move upward in such a manner that the distal end 42 of the sliding shaft opens the Schrader-type valve in the ether canister, to thereby allow ether to flow from the canister into the valve inlet 16 and through the gas pathway 14 of the valve body 12. A return spring 44 is operatively connected between the valve body 12 and the armature 38, for urging the armature 38 and sliding shaft 40 to move downward, when electrical current is removed from the electrical coil 36, to thereby allow the Schrader valve in the canister to return to its closed position, whenever electrical current is not flowing through the coil 36.

The control valve 12 further includes a valve element 46, in the form of a conical shaped valve poppet, disposed in the gas pathway 14 for selectively opening and closing the gas pathway 14. Specifically, in the exemplary embodiment, the conical-shaped poppet 46 is attached to the sliding shaft 40 within the valve inlet 16, and is configured to seat within a corresponding conical-shaped valve seat 48 of the valve body 12.

The conical-shaped valve poppet and seats 46, 48 are cooperatively configured, and the valve poppet 46 is attached to the sliding shaft 40, at such a location, that when the solenoid 30 is not being powered, the valve poppet 46 will be firmly seated in the conical-shaped valve seat 48, to thereby close-off flow through the gas pathway 14, and, in such a manner that when the solenoid 30 is powered, the sliding shaft 40 will lift the poppet 46 free from the conical-shaped valve seat 48, to thereby open the gas pathway 14 and allow a flow of gas therethrough.

Having the valve poppet 46, and valve seat 48 be conical-shaped, and centrally located, as in the exemplary embodiment of the control valve 10 provides several advantages. The corresponding conical shapes of the poppet 46 and seat 48 provide for positive sealing, to thereby preclude having a vacuum leak through the control valve 10, when the ether canister is not sealingly engaged with the inlet seal 18. As compared to other possible shapes for the poppet 46 and valve seat 48, the conical shaped selected for the exemplary embodiment provides a more positive and reliable seal, than can be achieved over the life of the valve in comparison to previous valves which relied upon a sliding circumferential seal between stationary O-rings and a sliding shaft. The centrally-located conical shaped valve seat 48, of the exemplary embodiment is also much more readily formed during manufacture of the control valve 10 than previous arrangements requiring more complex valve seat configurations for sealing against an axially directed elastomeric element, such as the arrangement taught by the Burke '469 patent, discussed in the background section above.

The exemplary embodiment of the control valve 10, shown in FIG. 2, also includes a metering device 50, and a two-stage filter apparatus 52, disposed substantially at a valve outlet 54. The two-stage filter apparatus 52 includes a primary element 56 and a secondary element 58. In the exemplary embodiment, the flow metering device 50, and secondary element 58 of the two-stage filter apparatus 52 are located and constrained within a bore 60 of an outlet fitting 62, which is threadably attached to the valve body 12 at the valve outlet 54. An O-ring 66 is inserted into the bore 60 and the fitting 62, behind the secondary element 58, to secure the flow metering device 50 and secondary element 58 within the bore 60 of the outlet fitting 62.

A second pair of O-rings 68, one disposed on either side of the primary element 56, are utilized for securing the primary element 56 within an expanded bore portion 70 of the valve outlet 54.

Those having skill in the art will recognize that, by virtue of this arrangement of the flow metering device 50 and two-stage filter apparatus 52 of the exemplary embodiment, the flow metering device 50 and secondary element 58 are readily accessible by removing the outlet fittings 62 from the valve body 12, so that the flow metering device 50 may be installed at a very late stage in a manufacturing process, or at the time of connecting the control valve 10 to an engine, to match the flow metering device 50 to the needs of a particular engine application. With the outlet fitting 62 removed, the secondary element 58, of the two stage filter apparatus 52, is readily accessible for cleaning or replacement, should the need arise. With the outlet fitting 62 removed, the primary element 56 of the two-stage filter apparatus is also relatively easily accessible, for cleaning and/or replacement.

Those having skill in the art will also recognize, that by virtue of the arrangement described above, the electrical coil 36, and/or the entire stator portion 32 of the solenoid 30 can be replaced, without disturbing the operative attachments to either the valve inlet 16 or the valve outlet 54. The configuration of the grippable portion 26 of the solenoid retention element 24 may vary, according to the design philosophy for a particular application. Where it is desirable to have the electrical coil 36 be readily replaceable, with the use of commonly available hand tools, the grippable portion 26 may be configured to include flats, or some other external configuration for mating with standard wrenches, screwdrivers, etc. Where it is desirable to have the electrical coil 36 still be replaceable, but to not invite unnecessary application of force, for stance, it may be desirable to have the grippable portion be knurled for gripping by the finger and thumb of a repair man, or to have the grippable portion 26 of the solenoid retention element 24 be configured to receive force applied thereto only from a special type of wrench.

Those having skill in the art, will recognize, that the various aspects and elements of the invention, as described herein, may be utilized by themselves, or in combinations other than those expressly laid out in the exemplary embodiments described herein and the attached drawings.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter as permitted by applicable law. Moreover, any combination of the above-described elements in all possible variations thereof is encompassed by the invention unless otherwise indicated herein or otherwise clearly contradicted by context.

What is claimed is:

1. A starting fluid injection control valve for supplying ether to an engine, the control valve comprising:

a valve body defining a gas pathway therethrough, the gas pathway having a valve inlet adapted for operative attachment thereto of a source of ether and a valve outlet adapted for operative attachment to an engine;

a valve element operatively disposed in the pathway for selectively opening and closing the gas pathway; and an electrical solenoid operatively attached to the valve body and the valve element, for selectively actuating the valve element in a manner causing a corresponding opening and closing the gas pathway;

the electrical solenoid having an electrical coil configured and operatively attached to the control valve in such a manner that the electrical coil may be removed and replaced, without disturbing the operative connection between the valve outlet and the engine, and wherein, the electrical coil is further configured and operatively attached to the control valve in such a manner that the electrical coil may be removed and replaced, without disturbing the operative connection between the valve inlet and the source of ether, and further comprising, a solenoid retention element, adapted for removably clamping the electrical coil to the valve body, and wherein: the solenoid retention element defines a hollow internal cavity thereof:

the electrical coil is positioned about the internal cavity for generating an electromagnetic field within the hollow internal cavity; and the control valve further comprises a solenoid armature slidingly disposed within the hollow internal cavity of the solenoid retention element, and wherein, the solenoid retention element has a first, open end thereof, adapted for threaded attachment to the valve body, and a second closed end thereof adapted for applying clamping force against the electrical coil as the solenoid retention element is threaded into the valve body, the second end of the solenoid retention element being further configured to provide an outer surface thereof which is accessible externally for application of torque thereto for threading the solenoid retention element into the valve body and for unscrewing the solenoid retention element from the valve body, to thereby allow for removal and replacement of the electrical coil, and further comprising, a sliding shaft, attached to the armature, and extending through at least a portion of the gas pathway, for actuating the valve element, and wherein: the inlet of the valve is adapted for attachment thereto of a source of starting fluid having an outlet valve including an axially movable outlet valve actuator;

and the sliding shaft of the control valve is attached at one axial end thereof to the armature and further comprises an axially spaced distal end thereof adapted for contacting and opening the axially movable outlet valve actuator of the outlet valve of the source of starting fluid, and wherein, the valve element is configured and operatively attached to the sliding shaft in such a manner that the valve element is opened when the sliding shaft is positioned to open the outlet valve of the source of starting fluid, and is closed when the sliding shaft is not positioned to open the outlet valve of the source of starting fluid.

2. The control valve of claim 1, wherein, the valve element comprises a conical-shaped poppet operatively disposed in the pathway for selectively opening and closing the gas pathway.

3. The control valve of claim 2, wherein the valve body further comprises a conical-shaped valve seat for cooperatively receiving therein the conical-shaped poppet.

4. The control valve of claim 3, wherein the conical-shaped poppet is disposed adjacent the valve inlet.

5. The control valve of claim 4, wherein the conical-shaped poppet and valve seat are disposed adjacent the valve inlet.

* * * * *